(12) United States Patent
Griffiths

(10) Patent No.: US 6,604,734 B1
(45) Date of Patent: Aug. 12, 2003

(54) METHOD OF RETAINING AN AIR SUSPENSION

(75) Inventor: Paul J. Griffiths, Chester (GB)

(73) Assignee: Meritor Heavy Vehicle Systems Limited (GB)

( * ) Notice: Subject to any disclaimer, the term of this patent is extended or adjusted under 35 U.S.C. 154(b) by 0 days.

(21) Appl. No.: 09/525,862

(22) Filed: Mar. 14, 2000

(Under 37 CFR 1.47)

(51) Int. Cl.[7] .................................................. F16F 5/00
(52) U.S. Cl. ............................... 267/64.14; 267/64.28; 267/64.19; 267/64.27; 280/43.17; 280/86.5
(58) Field of Search ........................... 267/64.14, 64.16, 267/64.19, 64.23, 64.27, 64.28; 180/209; 280/43, 43.17, 43.23, 86.5

(56) References Cited

U.S. PATENT DOCUMENTS

| | | | | |
|---|---|---|---|---|
| 4,798,369 A | * | 1/1989 | Geno et al. ............... | 267/64.11 |
| 4,881,747 A | * | 11/1989 | Raidel ....................... | 280/81.6 |
| 5,058,916 A | | 10/1991 | Hicks | |
| 5,346,247 A | | 9/1994 | Snyder | |
| 5,351,986 A | | 10/1994 | Hedenberg et al. | |
| 5,403,031 A | | 4/1995 | Gottschalk et al. | |
| 5,655,788 A | | 8/1997 | Peaker | |
| 6,073,491 A | * | 6/2000 | Fischer et al. ............. | 73/629 |

FOREIGN PATENT DOCUMENTS

| | | | | |
|---|---|---|---|---|
| DE | 0120332 | * | 2/1984 | ............... 267/64.11 |
| DE | 0361041 | * | 8/1989 | ............... 267/64.11 |
| DE | 0464412 | * | 6/1991 | ............... 267/64.11 |
| DE | 0554573 | * | 12/1992 | ............... 267/64.11 |
| DE | 29615901 | * | 12/1996 | ............... 267/64.11 |
| EP | 554573 A2 | | 8/1993 | ........... B60G/11/27 |
| EP | 742113 A1 | | 11/1996 | ........... B60G/11/46 |
| NL | 0742113 | * | 11/1996 | ............... 267/64.11 |

* cited by examiner

Primary Examiner—Christopher P. Schwartz
Assistant Examiner—Devon Kramer
(74) Attorney, Agent, or Firm—Carlson Gaskey & Olds

(57) ABSTRACT

A method of retaining a suspension system includes creating a negative pressure within an air spring such that a longitudinal member is retained in a substantially fixed position relative to a chassis component when the longitudinal member is placed in an unloaded condition. When there is no pressure in the air spring, the air cell is deflated and the suspension is mechanically bottomed out. By further introducing a negative pressure into the air cell with the gas feed, a partial vacuum is formed and the air cell collapses in upon itself. The collapsed air cell grips the piston thereby immobilizing the air spring. Accordingly, when the vehicle is lifted and the air suspension becomes unloaded, the longitudinal member is maintained relative to the chassis component by the immobilized air spring to thereby prevent the air cell from being inverted and damaged.

12 Claims, 3 Drawing Sheets

METHOD OF RETAINING AN AIR SUSPENSION

BACKGROUND OF THE INVENTION

The present invention relates to an air suspension, and more particularly to a method for retaining the air suspension in a fixed condition when the vehicle is lifted and the air suspension is in an unloaded condition.

A common air suspension system typically comprises a chassis of a vehicle and a longitudinal member extending generally lengthwise of the vehicle for pivoting about an axis generally transverse of the vehicle. The longitudinal member carries an axle having one or more road wheels. An air spring having a piston and an air cell is mounted spaced from the axis and act as an adjustable compression spring between the vehicle and the longitudinal member to bias the wheels for effective road engagement and to buffer axle and wheel vibration.

Vehicles fitted with an air suspension are sometimes used without being inflated such as when being transported on railroad cars. At other times the vehicle axles are left to hang away from the chassis in an unloaded condition on the wheels such as when the vehicle is lifted on and off a ship. These operations cause the air spring to extend without air and pull away from the piston causing the air cell to "snap through" or invert. Once the air cell inverts, the air spring may have difficulty being correctly inflated. Further, if a load is again placed on the suspension while the air cell is inverted, the air spring is compressed and the air cell may become trapped between the piston and upper mounting resulting in damage to the air cell.

Accordingly, it is desirable to provide a method of retaining the air suspension in a fixed condition when the vehicle is lifted and the air suspension is in an unloaded condition to prevent inversion and the resultant damage to the air spring.

SUMMARY OF THE INVENTION

The air suspension according to the present invention includes an air spring having an air cell and a piston which act as a compression spring between a longitudinal member and a chassis component. The air cell is powered by the piston which is actuated by a gas feed connected to the vehicle air supply. Preferably, a bottom of the piston is attached to the longitudinal member and the air cell is attached to a top of the piston.

When there is no pressure in the air spring, the air cell is deflated and the suspension is mechanically bottomed out. The invention introduces a negative pressure into the air cell at this condition. A partial vacuum is formed and the air cell collapses in upon itself. The collapsed air cell grips the piston thereby immobilizing the air spring.

As the piston is attached to the longitudinal member and the air cell to the chassis component, the longitudinal member is retained in a substantially fixed position relative to the chassis component. Accordingly, when the vehicle is lifted and the air suspension becomes unloaded, the longitudinal member is maintained relative to the chassis component by the immobilized air spring to thereby prevent the air cell from being inverted and damaged.

In one embodiment, a switch is contracted when the piston bottoms out. The switch actuates the vacuum source. A vehicle having an air suspension is also commonly fitted with an anti-vacuum system. The present invention closes the anti-vacuum system prior to providing a negative pressure within the air cell. The anti-vacuum system is thus prevented from interfering with the desired collapsed condition within the air cell.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
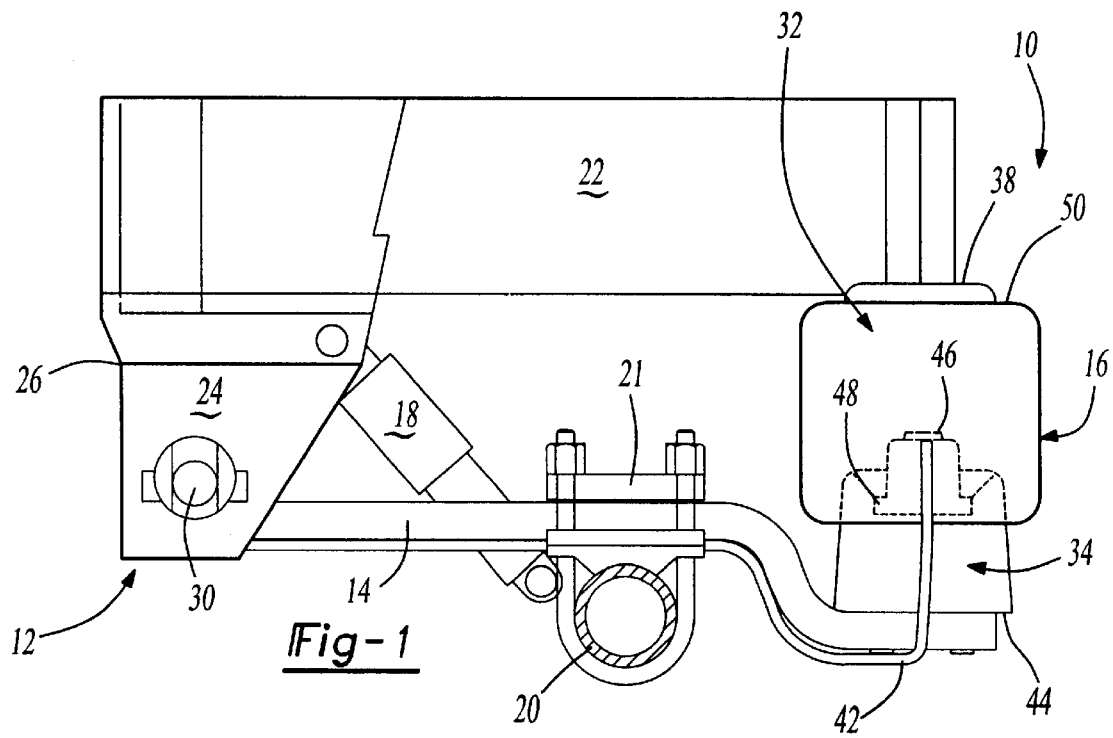
FIG. 1 is a general side view of a vehicle suspension system according to the present invention.

FIG. 1 illustrates an air suspension system 10 for a vehicle in a partially pressurized condition. The system 10 generally includes a bracket 12, a longitudinal member 14, an air spring 16, a damper 18 and an axle assembly 20. The system is fixed to a chassis component of the vehicle (shown schematically at 22).

The disclosed bracket 12 has side members 24 which depend from the chassis, and a front plate 26 interconnecting the side members 24. The bracket 12 thus has a box-like construction, however, one skilled in the art will understand that other bracket configurations would benefit from the present invention.

The longitudinal member 14 extends generally lengthways of the vehicle and is pivotally connected within the bracket 12 to a pivot 30. The pivot 30 permits movement of the longitudinal member 14 and defines an axis generally transverse of the vehicle. From the pivot 30, the longitudinal member 14 extends rearwardly to mount the air spring 16. An axle assembly 20 of the vehicle is secured to the longitudinal member 14 between the pivot 30 and the air spring 16 by a clamp 21. A telescopic suspension damper 18 interconnects the axle assembly 20 and the bracket 12.

The air spring 16 includes an air cell 32 and a piston 34 which act as a compression spring between the longitudinal member 14 and the chassis component 22 to bias the wheels (not shown) for effective road engagement and to buffer the axle and wheel from vibration. The air spring 16 further includes a mounting plate such as a bead plate 38. The bead plate 38 is attached to the air cell 32 and connected to the chassis component 22. It is to be understood that the term air spring as used herein is not intended to be construed narrowly and should be taken to include bellows, air bags, and so forth.

Figure 2:
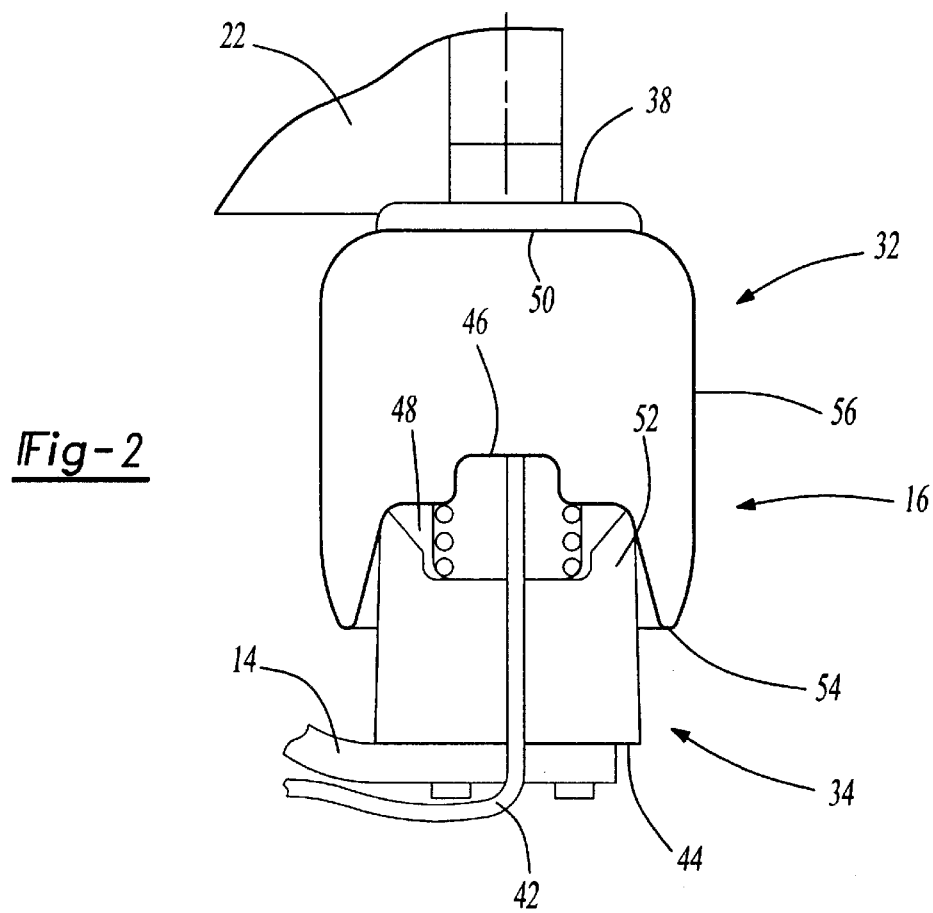
FIG. 2 is an exploded section view of the air spring of FIG. 1.

Referring to the sectional view of FIG. 2, the air cell 32 is powered by the piston 34. A bottom 44 of the piston 34 is attached to the longitudinal member 14 and the air cell 32 is attached to a top 46 of the piston 34. Preferably, the gas feed 42 extends along the longitudinal member 14 and enters the bottom 44 of the piston 34. Accordingly, the gas feed 42 is located in a protected location along the longitudinal member 14 which provides an efficient route to the piston 34.

The air cell 32 is a substantially tubular rubber member having a first end 48 and a second end 50. The first end 48 is attached to the top 46 of the piston 34. A first portion 52 extends from the first end 48 and fits along the piston 34 toward the longitudinal member 14. Preferably, the first portion 52 of the air cell 32 tightly conforms to the piston 34. The first portion 52 substantially follows the length of the piston 34 until it folds over at an intermediate point 54. A second portion 56 extends from the point 54 and overlays the first portion 52 as it extends toward the chassis 22. The second portion 56 extends to the second end 50 which is preferably attached to the bearing plate 38 mounted to the chassis 22. Although the air cell 32 has been described in a multiple of separate portions it should be realized that this is for descriptive purposes only and that the air cell 32 is a continuous member.

Upon extension of the air cell 34, the first portion 52 unrolls from the piston as the second portion 56 extends in length. In other words the point 54 is moving up the piston 34 toward the chassis 22 as the first portion 52 decreases in length and the second portion 56 extends in length. Similarly, when the air cell is deflated the opposite occurs. Point 54 moves down the piston 34 toward the longitudinal member 14 as the first portion 52 increases in length and the second portion 56 decreases in length.

Figure 3A:
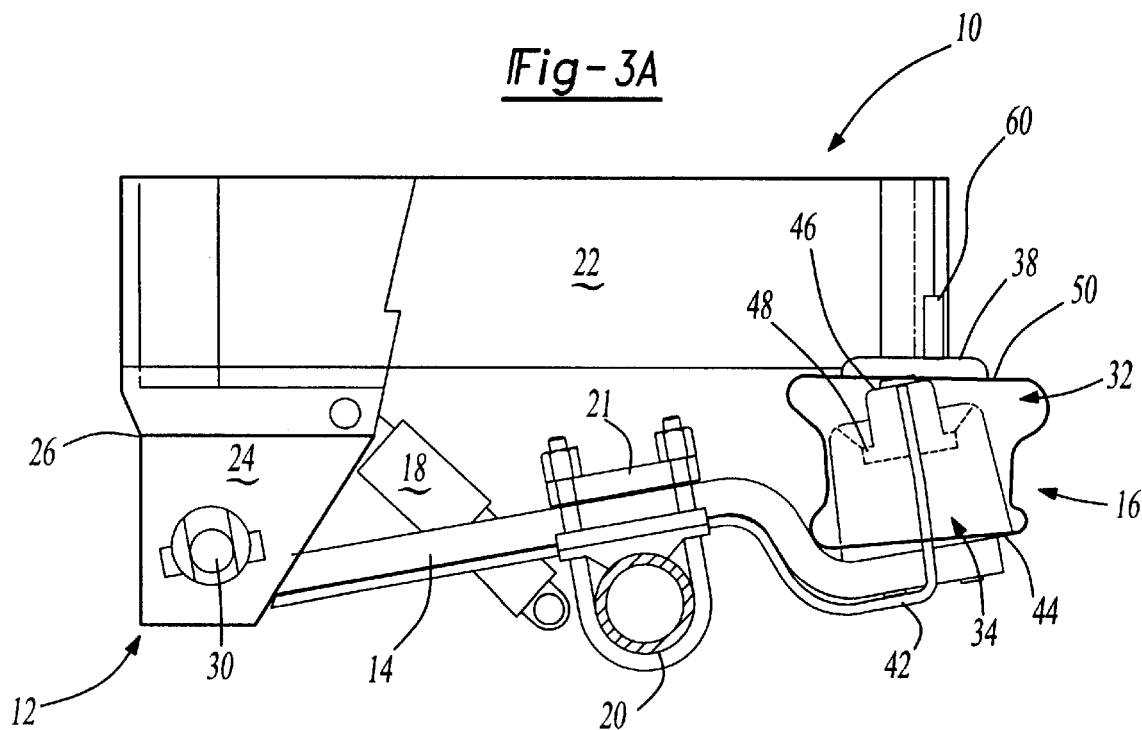
FIG. 3A is a general side view of the suspension system of FIG. 1 in an unloaded condition showing the air spring under a negative pressure according to the present invention.

FIG. 3A illustrates the suspension system of FIG. 1 in an unloaded condition showing the air spring 16 under a negative pressure. The piston 34 is attached to the longitudinal member 14 and the air cell 32 to the chassis component 22. As described below, the invention introduces a negative pressure into the air cell 32, the immobilized air spring 16 retains the longitudinal member 14 in a substantially fixed position relative to the chassis component 22. Accordingly, when the vehicle is lifted and the air suspension becomes unloaded, the longitudinal member 14 can not freely extend from the chassis component 22. The air cell 32 is thus prevented from being overextended and possibly inverting.

As shown in FIG. 3A, when the air cell 32 is deflated, the top 46 of the piston 34 contacts the bearing plate 38. This condition occurs when the air spring 16 is deflated and the suspension is mechanically bottomed out such as when the vehicle is being prepared for lifting onto a transport.

By further introducing a negative pressure into the air cell 32, a partial vacuum is formed and the air cell 32 collapses in upon itself. The air spring 16 is thereby immobilized. To initiate the negative pressure condition, a switch 60 may be mounted to the bearing plate 38. The switch 60 is preferably an intermittent switch that is activated only when contacted. Contact between the top 46 of the piston 34 and the bearing plate 38 activates the switch 60. The switch is shown schematically. Other switch positions or methods for identifying the need for vacuum activation may also be used. As an example, a switch may be positioned to be actuated as the piston is approaching the bottomed-out position of FIG. 3A.

Figure 3B:
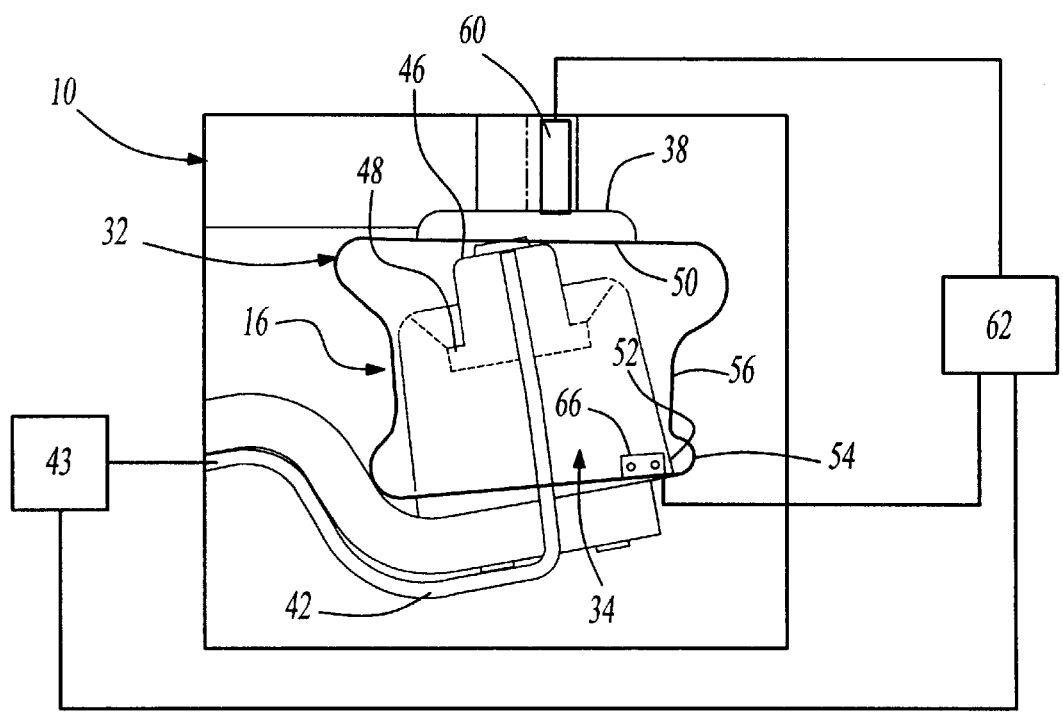
FIG. 3B is an exploded section view of the air spring of FIG. 3A and a general schematic view of a suspension system according to the present invention.

As shown in FIG. 3B, activation of the switch 60 is identified by a controller 62 in communication with the switch 60. The controller identifies activation of the switch 60 and reverses gas flow through feed 42. Preferably, the controller 62 is in communication with the vehicles air supply system 43 which operates the piston 34. Reverse operation of piston 34 reverses the gas flow through feed 42 to thereby obtain a predetermined negative pressure within the air cell 32. The predetermined negative pressure collapses the air cell 32.

As the suspension is mechanically bottomed out, the air cell 34 can only collapse in upon itself. Negative pressure causes the air cell 34 second portion 56 to be drawn into contact with the first portion 52. The piston 34 is thereby gripped by the collapsed first 52 and second 56 portion of the air cell 32. The air spring 16 is thereby immobilized. In other words, the normal air spring 16 pressurization process is reversed to create a partial vacuum in the air cell 32 causing the air cell 32 to collapse inwards. The vehicle is thus readied for lifting.

A vehicle having an air suspension system 10 is also commonly fitted with an anti-vacuum system (shown schematically at 66.) The anti-vacuum system 66 is typically one or more orifices having one-way valves 69 (FIG. 4) that equalize the pressure within the air cell 32 with the surrounding atmospheric pressure. When the air cell 32 is pressurized by the gas feed 42, the interior 71 of air cell 16 is at a pressure higher than atmospheric pressure 72 and the one-way valves remain closed. A vacuum condition normally cause the one-way valves to open and equalize the pressure.

Figure 4:
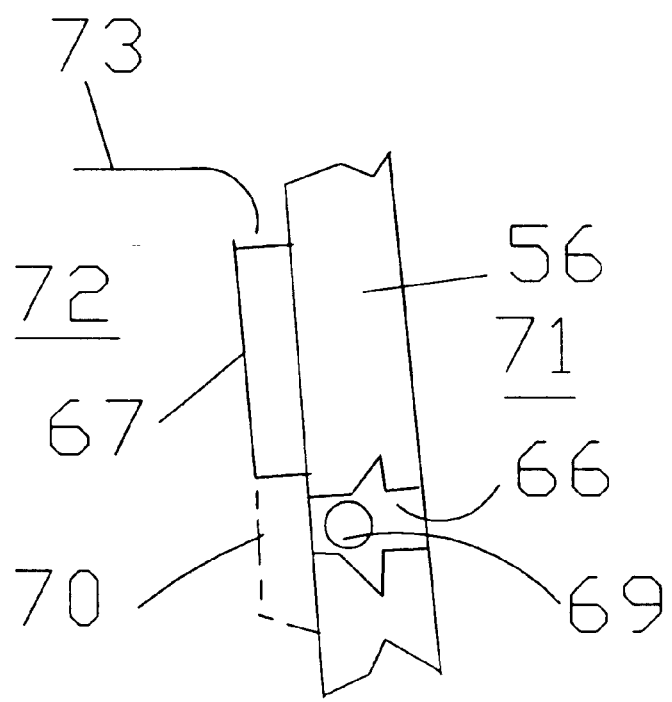
FIG. 4 shows a detail.

Accordingly, the controller 62 also preferably magnetically actuate valves 67, shown schematically in FIG. 4, to close the anti-vacuum system 66 prior to reverse operation of the piston 34. Valve 67 is connected at 73 to control 62. The valve 67 may be as known, and driven to close valves 66 as shown in phantom at 70. The anti-vacuum system 66 is thereby prevented from interfering with the desired negative pressure condition within the air cell 32.

The predetermined negative pressure is greater than the negative pressure required to suspend the mass of the longitudinal member 14 and the axle assembly 20. Once the predetermined negative pressure is obtained within the air cell 32, the controller 62 stops the piston 34 and the negative pressure is maintained. Similarly, to release the negative pressure, the controller 62 can magnetically releases the one-way valves. The anti-vacuum system 66 opens and the negative pressure condition is dissipated.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of retaining an air spring comprising:
   (1) attaching an air spring to a moveable member and a fixed member; and
   (2) creating a negative pressure within said air spring such that said moveable member is retained by said air spring in a substantially fixed position relative to said fixed member when said moveable member is placed in an unloaded condition.

2. The method as recited in claim 1, wherein step 2 is automatically activated when said air spring moves to a deflated condition.

3. The method as recited in claim 2, further comprising the step of closing an anti-vacuum orifice as part of said step 2.

4. The method as recited in claim 2, wherein said automatic actuation occurs when a component bottoms out and contacts a switch.

5. The method as recited in claim 1, wherein said step 2 further comprises deflating said air spring; and maintaining the movable longitudinal member in contact with the air spring while the movable member is in an unloaded condition.

6. The method as recited in claim 1, wherein said step 2 further comprises preventing the movable longitudinal member from freely extending from the fixed member.

7. A method of retaining an air suspension system comprising:

(1) pivotally mounting a moveable longitudinal member to a fixed chassis component;

(2) attaching an air spring to said moveable longitudinal member and said chassis component; and (3) creating a negative pressure within said air spring such that said longitudinal member is retained by said air spring in a substantially fixed position relative to said chassis component when said moveable longitudinal member is placed in an unloaded condition.

8. The method as recited in claim 7, wherein said step 3 is automatically activated when said air spring is in a deflated condition.

9. The method as recited in claim 8, further comprising the step of closing an anti-vacuum orifice as part of said step 3.

10. The method as recited in claim 8, wherein said automatic actuation occurs when a component bottoms out and contacts a switch.

11. The method as recited in claim 10, wherein said step 3 further comprises preventing the movable longitudinal member from freely extending from the fixed member.

12. A method of retaining an air suspension system comprising:

(1) pivotally mounting a moveable longitudinal member to a fixed chassis component;

(2) attaching an air spring to said moveable longitudinal member and said chassis component;

(3) deflating the air spring;

(4) identifying said step 3 and closing an anti-vacuum orifice within the air spring in response thereto; and (5) unloading the moveable longitudinal member such that a negative pressure is formed within said air spring, said longitudinal member retained by said air spring in a substantially fixed position relative to said chassis component while said moveable longitudinal member is in the unloaded condition.

* * * * *